(12) United States Patent
Uchida (10) Patent No.: US 7,630,122 B2
(45) Date of Patent: Dec. 8, 2009

(54) ELECTRO-OPTICAL DEVICE, METHOD OF MANUFACTURING ELECTRO-OPTICAL DEVICE AND ELECTRONIC APPARATUS

(75) Inventor: Masami Uchida, Chino (JP)

(73) Assignee: Seiko Epson Corporation, Tokyo (JP)

( * ) Notice: Subject to any disclaimer, the term of this patent is extended or adjusted under 35 U.S.C. 154(b) by 234 days.

(21) Appl. No.: 11/978,736

(22) Filed: Oct. 30, 2007

(65) Prior Publication Data

US 2008/0123178 A1 May 29, 2008

(30) Foreign Application Priority Data

Nov. 28, 2006 (JP) ............................. 2006-319916

(51) Int. Cl.
*G02B 26/00* (2006.01)
(52) U.S. Cl. ..................................... 359/296
(58) Field of Classification Search ................ 359/296, 359/237, 245, 248, 254; 430/32, 34, 38; 345/107, 105
See application file for complete search history.

(56) References Cited

U.S. PATENT DOCUMENTS 4,775,964 A * 10/1988 Alessio et al. ................ 368/67

FOREIGN PATENT DOCUMENTS

| JP | 56-123320 | 9/1981 |
| JP | 02-289823 A | 11/1990 |
| JP | 11-305246 A | 11/1999 |
| JP | 2001-091955 A | 4/2001 |
| JP | 2004-184498 A | 7/2004 |

* cited by examiner

*Primary Examiner*—Ricky L Mack
*Assistant Examiner*—Tuyen Q Tra
(74) *Attorney, Agent, or Firm*—AdvantEdge Law Group, LLC (57) ABSTRACT

An electro-optical device includes a pair of substrates arranged so as to face each other, an electro-optical material layer interposed between the pair of substrates, a through hole penetrating through the pair of substrates and the electro-optical material, and a encapsulating member disposed in the through hole for sealing the electro-optical material layer while being disposed between the pair of substrates, in which the encapsulating member is disposed closer to the electro-optical material layer than an outer surface of a display substrate of the pair of substrates and outside an entrance portion of the through hole, in a plan view, the entrance portion being on an outer surface side of the display substrate.

10 Claims, 6 Drawing Sheets

ELECTRO-OPTICAL DEVICE, METHOD OF MANUFACTURING ELECTRO-OPTICAL DEVICE AND ELECTRONIC APPARATUS

BACKGROUND

1. Technical Field

The present invention relates to an electro-optical device, a method of manufacturing an electro-optical device, and an electronic apparatus.

2. Related Art

Electro-optical devices, such as liquid crystal devices and electrophoretic devices have been widely used, for example, as displays of mobile phones, display parts of watch faces, and light bulbs of projectors. Generally, an electro-optical device is composed of a pair of substrates made of glass or the like and an electro-optical material layer interposed between the substrates. An electro-optical device used as a face of an analog watch has a through hole in a display region with a hand spindle installed therein.

JP-UM-A-56-123320 discloses a technique in which a through hole is provided in a display region, and a sealing material is provided in the through hole in order to prevent impurities from intruding into an electro-optical material layer. That is, the electro-optical material layer is sealed by the sealing material. In addition, there is a further known technique in which a sealing material is provided around the through hole in a display region and an encapsulating member made of resin or the like is further provided so as to cover the sealing material and an inner surface of the through hole. According to this technique, thanks to the dual-sealing scheme, it is possible to reliably prevent impurities from intruding into the electro-optical material layer.

However, the above-mentioned known techniques have a problem in that a user can apparently discern the encapsulating member from the substrate around the hand spindle when the user watches the face of a watch because the substrate and the encapsulating member are made of different materials. At this time, the user may not like the appearance of the watch having the above structure. This may significantly influence marketability of products particularly in the case in which the products are watches or the like having a commercial value which is greatly influenced by the appearance thereof.

SUMMARY

An advantage of the invention is that it provides an electro-optical device, a manufacturing method of an electro-optical device and an electronic apparatus, which have a high commercial value and an appearance which users do not find unattractive.

According to one aspect of the invention, there is provided an electro-optical device including a pair of substrates arranged so as to face each other, an electro-optical material layer interposed between the pair of substrates, a through hole penetrating through the pair of substrates and the electro-optical material layer, and an encapsulating member disposed in the through hole so as to seal the electro-optical material layer while being disposed between the pair of substrates, in which the encapsulating member is disposed closer to the electro-optical material layer than an outer surface of a display substrate of the pair of substrates and disposed outside an entrance portion of the through hole, which is on an outer surface side of the display substrate, in a plan view.

According to this aspect, since the electro-optical device includes a pair of substrates arranged so as to face each other, an electro-optical material layer interposed between the pair of substrates, a through hole penetrating through the pair of substrates and the electro-optical material layer, and an encapsulating member provided in the through hole so as to seal the electro-optical material layer while being disposed between the pair of substrates, in which the encapsulating member is disposed closer to the electro-optical material layer than an outer surface of a display substrate of the pair of substrates and disposed outside an entrance portion of the through hole, which is on an outer surface side of the display substrate, in a plan view, there is no probability that the encapsulating member is present on the outer surface of the display substrate around the entrance portion of the through hole. It is therefore possible to realize the electro-optical device having appearance which is displeasing viewers and having a high commercial value.

In the electro-optical device, it is preferable that an inner surface of the through hole, on which the encapsulating member is disposed, is rough.

In this case, since the inner surface of the through hole, on which the encapsulating material is disposed, is rough, it is possible to increase a contact area that the inner surface of the through hole contacts the encapsulating member. Thanks to this structure, it is possible to inhibit impurities from intruding into the electro-optical material layer.

In the electro-optical device, it is preferable that the encapsulating member penetrates through one substrate of the pair of substrates, which is other than the display substrate.

In this case, since the encapsulating member penetrates through the substrate other than the display substrate, it is possible to inhibit impurities from intruding into the electro-optical material layer.

In the electro-optical device, it is preferable that the encapsulating member is disposed closer to the electro-optical material layer than an outer surface of the substrate other than the display substrate.

In this case, since the encapsulating member is disposed closer to the electro-optical material layer than the outer surface of the substrate other than the display substrate, the encapsulating member is present neither on the outer surface of the display substrate nor on the outer surface of the substrate which is other than the display substrate. That is, the encapsulating member is completely received in the electro-optical device. As a result, it is possible to obtain the encapsulating member having a stable form.

In the electro-optical device, it is preferable that the electro-optical material layer is an eletrophoresis layer having a plurality of capsules, each being composed of colored particles which cause an electrophoretic reaction and a dispersion medium for making the colored particles disperse therein.

In this case, the electro-optical material layer is an electrophoresis layer having a plurality of capsules, each containing colored particles which cause an electrophoretic reaction and a dispersion medium for making the color particles disperse therein. Accordingly, there is no risk that electro-optical material of the electro-optical material layer leaks out as a liquid behaves like such. For this reason, it is possible to decrease area of the encapsulating member, and thus it is possible to increase area of a display region.

According to another aspect of the invention, there is provided a method of manufacturing an electro-optical device including a pair of substrates arranged so as to face each other and an electro-optical material layer interposed between the pair of substrates. The method includes arranging the pair of substrates to so as face each other, forming a continuous hole which links the electro-optical material layer with the pair of substrates except for part of a display substrate of the pair of substrates, which is on an outer surface side of the display substrate, sealing the electro-optical material layer inside the continuous hole and forming a through hole which penetrates through the pair of substrates and the electro-optical material layer and which has a diameter smaller than that of the continuous hole within a region where the continuous hole is provided.

According to this aspect, since an electro-optical device is manufactured by arranging a pair of substrates so as to face each other, forming a continuous hole which links the electro-optical material layer with the pair of substrates except for part of a display substrate of the pair of substrates, which is on an outer surface side of the display substrate, sealing the electro-optical material layer inside the continuous hole and forming a through hole which penetrates through the pair of substrates and the electro-optical material layer and which has a diameter smaller than that of the continuous hole within a region where the continuous hole is provided, it is possible to manufacture the electro-optical device without allowing the encapsulating member to be present around an entrance to the through hole on an outer surface of the display substrate. Thus, it is possible to realize an electro-optical device having appearance which is not displeasing viewers and having a high commercial value.

In the method, it is preferable that the continuous hole is formed through a procedure in which a first concave is formed in the display substrate before arranging the pair of substrates so as to face each other in a manner such that the first concave terminates at a midway portion of the display substrate so that part of the display substrate, which is on the outer surface side of the display substrate remains unpenetrated, a second concave is formed in one substrate other than the display substrate in a manner such that the second concave terminates at a midway portion of the substrate other than the display substrate so that part of the substrate, which is on an outer surface side of the substrate, remains unpenetrated, and the display substrate and the substrate other than the display substrate are arranged in a manner such that the first concave and the second concave face each other.

In the method, it is preferable that the continuous hole is formed so as to penetrate through the substrate other than the display substrate.

In this case, since the continuous hole penetrates through the substrate other than the display substrate, it is possible to easily seal the electro-optical material layer.

In the method, it is preferable that the electro-optical material layer is a liquid crystal layer and is placed between the pair of substrates after formation of the through hole.

In this case, since the electro-optical material layer is a liquid crystal layer and is placed between the pair of substrates after formation of the through hole, it is possible to reliably seal the electro-optical material layer even if the electro-optical material layer is in the form of a liquid layer like a liquid crystal layer.

According to further aspect of the invention, there is provided an electronic apparatus including the electro-optical device according to the above aspect of the invention or the electro-optical device manufactured by the manufacturing method according to the above aspect of the invention.

According to the invention, it is possible to realize an electronic apparatus with good design by mounting the electro-optical device having appearance which is not displeasing viewers and having a high commercial value on the electronic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
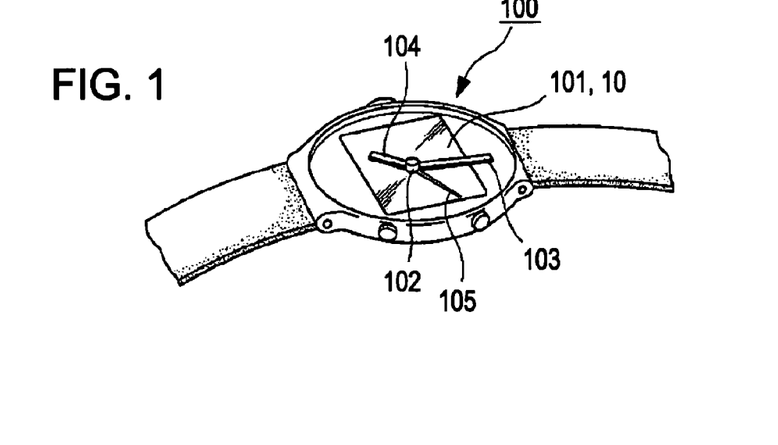
FIG. 1 is a perspective view illustrating a structure of a wrist watch according to a first embodiment.

FIG. 1 shows a structure of a wrist watch in which an electro-optical device according to a first embodiment is mounted. The wrist watch 100 includes a watch face 101, a hand spindle 102, a minute hand 103, an hour hand 104 and a second hand 105. The watch face 101 is mainly composed of an electrophoretic device 10.

Figure 2:
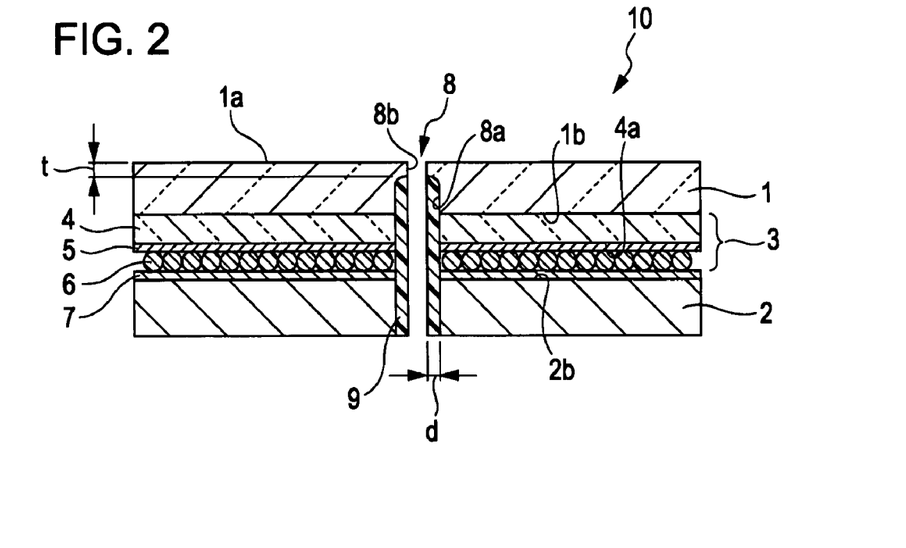
FIG. 2 is a sectional view illustrating an electrophoretic device according to the first embodiment.

FIG. 2 shows a structure of the electrophoretic device 10. As shown in FIG. 2, the electrophoretic device 10 is mainly composed of a pair of substrates (a display substrate 1 and an element substrate 2) arranged to face each other and an electro-optical material layer 3 interposed between the display substrate 1 and the element substrate 2. The electrophoretic device 10 includes a plurality of sub-pixels displaying different colors. The sub-pixels are arranged in a matrix form. There are red sub-pixels displaying red color, green sub-pixels displaying green color, blue sub-pixels displaying blue color, and black sub-pixels displaying black color. One red sub-pixel, one green sub-pixel, one blue sub-pixel, and one black sub-pixel constitute one pixel.

The display substrate 1 is made of a light-transmissible material such as glass or the like. The display substrate 1 is a plate-shaped member having a thickness of 500 μm. An outer surface 1a of the display substrate 1 serves as a display surface on which still image pictures, motion image pictures or the like are displayed.

The element substrate 2 can be made of a variety of materials, such as glass, plastic, and a metal plate, for example a stainless steel plate, with an insulation layer thereon. The element substrate 2 may be a plate-shaped member having a thickness of 500 μm. The element substrate is not necessarily light-transmissible.

A pixel electrode layer 7 is formed on an inner surface 2b of the element substrate 2. The pixel electrode layer 7 is provided with pixel electrodes for driving the electro-optical material layer 3 sub-pixels by sub-pixels, Thin-film Transistors (TFTs) for controlling the corresponding pixel electrodes, data lines and scan lines which supply electrical signals to the corresponding TFTs.

The electro-optical material layer 3 is composed of a film 4, a common electrode 5, and a plurality of microcapsules 6. The film 4 is a plate-shaped member made of a light-transmissible material, for example, polyethylene terephthalate (PET) and is bonded to the inner surface 1b of the display substrate 1. The common electrode 5 is made of a light-transmissible conductive material, for example, Indium Tin Oxide (ITO) and is formed over almost the entire face 4a of the film 4.

Each of the microcapsules 6 has a particle diameter of about 50 μm and is made of light-transmissible polymeric resin, for example, acryl resin, such as polymethacrylic acid methyl, polymethacrylic acid ethyl, or the like, urea resin, and Arabia rubber, or the like. The microcapsules 6 are disposed between the common electrode 5 and the pixel electrode layer 7. One sub-pixel includes a plurality of microcapsules 6 arranged in rows and columns. Each sub-pixel is provided with a binder which fills a gap around the microcapsule 6 in order to secure the microcapsule 6.

At a substantial center portion of the electrophoretic device 10 in a plan view thereof, a through hole 8 is formed so as to penetrate through the display substrate 1, the element substrate 2 and the electro-optical material layer 3. A hand spindle 102 is installed in the through hole 8. The through hole 8 is composed of a continuous portion 8a and an entrance portion 8b. The continuous portion 8a is formed so as to link the element substrate 2, the electro-optical material layer 3, and part of the display substrate 1 which is on a side of an inner surface 1b of the display substrate 1, with each other. The entrance portion 8b is disposed on a side of an outer surface 1a of the display substrate 1. The diameter of the continuous portion 8a is larger than that of the entrance portion 8b and gradually decreases from the continuous portion 8a toward the entrance portion 8b.

An encapsulating member 9 is disposed in the continuous portion 8b of the through hole 8. The encapsulating member 9 is made of transparent resin such as epoxy resin or the like. The encapsulating member 9 seals the electro-optical material layer 3 while being disposed between the display substrate 1 and the element substrate 2. The continuous portion 8b is disposed at a center portion of the electrophoretic device 10 in a plan view and has an inner diameter the same as or larger than the diameter of the entrance portion 8b by 200 μm to 4 mm and more preferably larger by 600 μm.

The encapsulating member 9 is not present on the outer surface 1a of the display substrate 1 but disposed near the electro-optical material layer 3. In detail, the encapsulating member 9 is provided so as not to be present on part of the display substrate 1 which is on an outer surface side of the display substrate 1 and has a thickness of t from the outer surface 1a of the display substrate 1. The thickness t is preferably not smaller than 50 μm and more preferably is about 200 μm. The encapsulating member 9 is preferably disposed outside the entrance portion 8b of the through hole 8, which is disposed on the outer surface side of the display substrate 1, in a plan view. Thickness d of the encapsulating member 9 is in a range from 100 μm to 2 mm.

Figure 3:
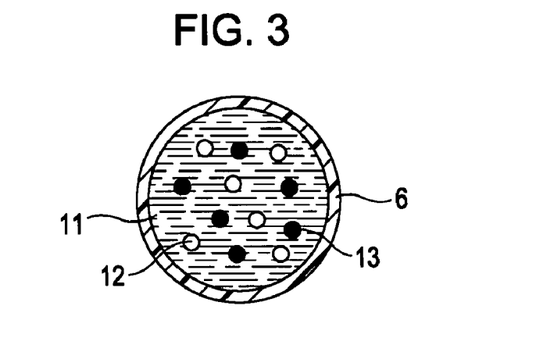
FIG. 3 is a sectional view illustrating an inner structure of a microcapsule of the electrophoretic device according to the first embodiment.

FIGS. 3 and 4 show the inner structure and operation of the microcapsule 6, respectively. As shown in FIG. 3, a dispersion liquid 11, white particles 12, and colored particles 13 are sealed in the microcapsule 6.

The dispersion liquid 11 can include water; an alcohol solvent, such as methanol, ethanol, isopropanol, butanol, octanol, and methyl cellosolve; esters such as ethyl acetate and butyl acetate; ketones such as acetone, methyl ethyl ketone, and methyl isobutyl tekone; aliphatic hydrocarbons such as ethyl acetate and pentane, hexane, and octane; alicyclic hydrocarbons such as cyclohexane and methylcyclohexane; aromatic hydrocarbons such as benzene, toluene, and zylene; long-chain alkylbenzenes such as hexylbenzene, heptylbenzene, octylbenzene, nonylbenzene, decylbenzene, undecylbenzene, dedecylbenzene, tridecylbenzene, and tetradecylbenzene; hydrocarbon halides such as methylene chloride, chloroform, carbon tetrachloride, and 1,2-dichloroethane; carboxylate; and other oils. These compounds can be used alone or in the form of a mixture thereof, in both cases being mixed with a surfactant. The dispersion liquid disperses white particles 12 and colored particles 13 therein.

The white particles 12 and the colored particles 13 have a property of migrating in the dispersion liquid 11, based on an electrophoretic phenomenon caused by a potential difference. The white particles 12 are particles (polymer or colloid) containing white pigment such as titanium dioxide, zinc oxide, and antimony trioxide and are positively charged.

The colored particles 13 (polymer or colloid) are composed of particles containing black pigment, such as aniline black, carbon black, or the like; azo-based pigment, such as monoazo, disazo, and polyazo; yellow pigment, such as isoindoline, chrome yellow, yellow iron oxide, cadmium yellow, titan yellow, antimony, or the like; red pigment, such as quinacridone red, chrome vermillion, or the like; blue pigment, such as phthalocyanine blue, indanthrene blue, anthraquinone, iron blue pigment, ultramarine blue pigment, cobalt blue, or the like; and green pigment such as phthalocyanine green. The colored particles are negatively charged. The colored particles 13 in a red sub-pixel, a green sub-pixel, a blue sub-pixel, and a black pixel are colored red, green, blue and black, respectively.

According to circumstances, the pigments may be mixed with a charge control agent containing electrolyte, surfactant, metal soap, resin, rubber, oil, varnish, and compound particles; a dispersion agent, such as titanium-based coupling agent, aluminum-based coupling agent, and silan-based coupling agent; lubricant agent; and stabilizer.

Figure 4A:
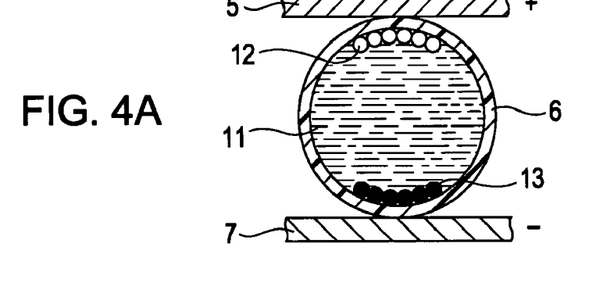
FIG. 4 is a sectional view illustrating operation of the microcapsule.

In operation of the microcapsule 6 having the above structure, as shown in FIG. 4A, when the pixel electrode is applied with a voltage contributing to a negative potential of the pixel electrode in the pixel electrode layer 7, colored particles 13 which are positively charged by column force migrate to the pixel electrode in the microcapsule 6 by attraction, and conversely the white particles 12 which are negatively charged migrate to the common electrode 5 in the microcapsule 6 by attraction. As a result, the white particles 12 gather on a display surface of the microcapsule 6 and thus color (white color) of the white particles 12 is displayed on the outer surface 1a.

Figure 4B:
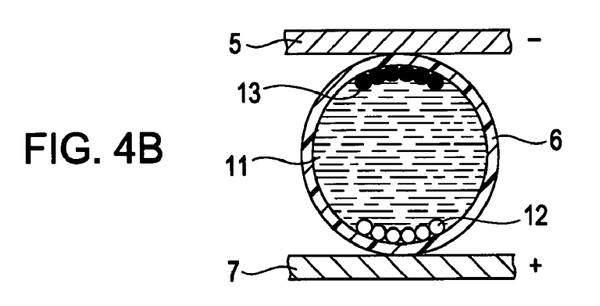

Conversely, as shown in FIG. 4B, when the pixel electrode is applied with a voltage contributing to a positive potential of the pixel electrode, the white particles 12 which are negatively charged by column force migrate to the pixel electrode 7 by attraction and the colored particles 13 which are positively charged are migrate to the common electrode 5 by attraction. As a result, the colored particles 13 gather on the display surface of the microcapsule 6 and thus a color (red, green, blue or black) is displayed on the outer surface 1a.

Figure 5:
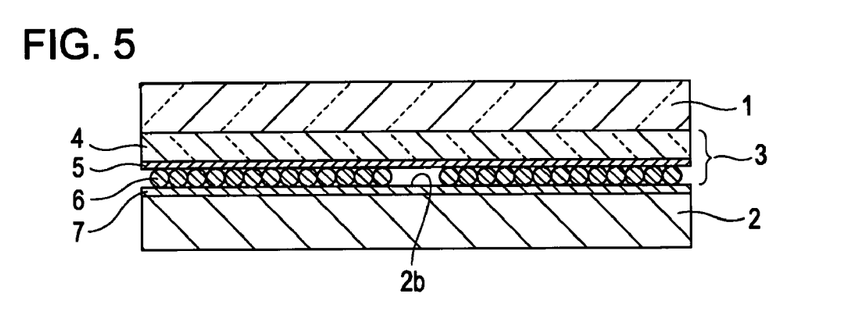
FIGS. 5 to 7 are sectional views illustrating processes of manufacturing the electrophoretic device according to the first embodiment.

Hereinafter, a method of manufacturing the electrophoretic device 10 having the above structure will be described. As shown in FIG. 5, pixel electrodes, TFTs, data lines and scan lines are formed on an inner surface 2a of an element substrate 2 to form a pixel electrode layer 7 in the first place. A film 4 with a common electrode 5 and a plurality of microcapsules 6 is bonded to the pixel electrode layer 7. The microcapsules 6, the pixel electrodes, and the TFTs are arranged so as not to be disposed at a center portion, in a plan view, of the display substrate 1 and the element substrate 2. The data lines and the scan lines extend around the center portion, in a plan view, of the display substrate 1 and the element substrate 2. Then, as shown in FIG. 5, the display substrate 1 and the element substrate 2 are bonded to each other.

Figure 6:
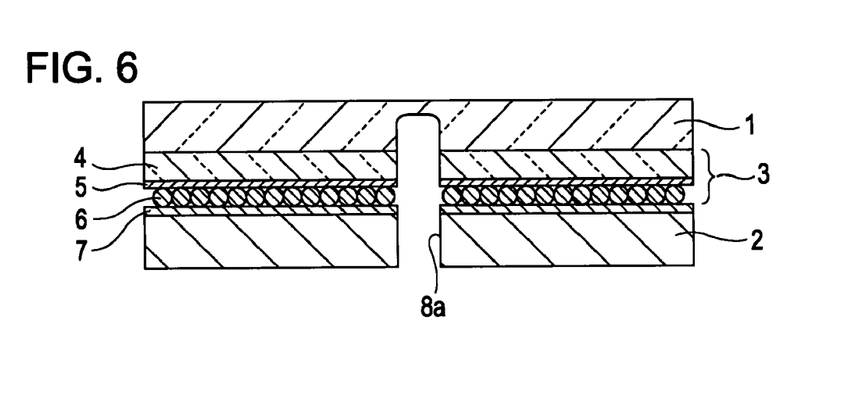

Subsequently, as shown in FIG. 6, a continuous portion 8a is formed so as to link the element substrate 2, the electro-optical material layer 3 and part of the display substrate 1, which is on a side of the inner surface 1a of the display substrate 1, with each other. In detail, a hole is formed by drilling the element substrate 2, the electro-optical material layer 3, and the display substrate 1 using a drill in a manner such that the element substrate 2 and the electro-optical material layer 3 are completely penetrated and part of the display substrate is penetrated, while leaving part of the display substrate 1, which has a thickness of 200 μm from the outer surface 1a of the display substrate 1, unpenetrated.

Figure 7:
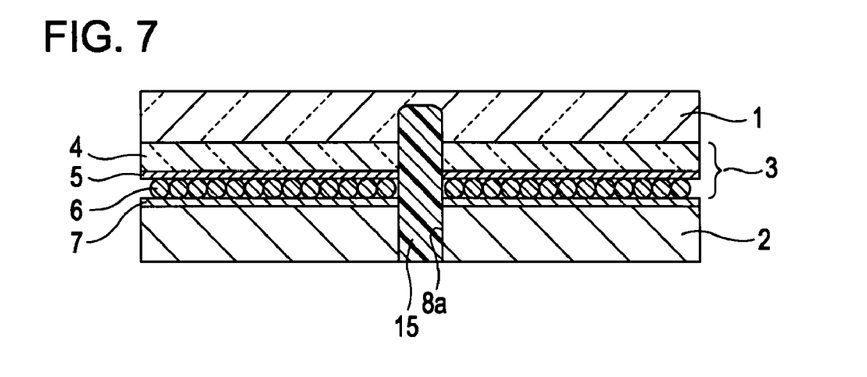

As shown in FIG. 7, thermosetting resin, for example, epoxy resin 15 having a viscosity of 10 to 5000 cp at room temperature is injected into the continuous portion 8a using a dispenser. If the viscosity is not higher than 10 cp, there is a risk that the epoxy resin 15 leaks out. Conversely, if the viscosity is not lower than 5000 cp, it is difficult for the epoxy resin to spread over the entire surface of the continuous portion 8a. According to this embodiment, the ideal viscosity of the thermosetting resin is about 2000 cp.

After injection of the epoxy 15, the epoxy resin 15 is cured at a temperature in a range from 100 to 120° C. for one hour while not causing damage to the microcapsules 6. After the epoxy resin 15 is cured, a through hole 8 is formed so as to penetrate through the epoxy resin 15 and the display substrate 1, while simultaneously forming the encapsulating member 9. Thus, the electrophoretic device 10 shown in FIG. 2 is completed.

According to this embodiment, in the through hole 8, the encapsulating member 9 is formed closer to the electro-optical material layer 3 than the outer surface 1a serving as a display surface of the display substrate 1 and is formed outside the entrance portion 8b of the through hole 8 which is on an outer surface side of the display substrate, in a plan view. Accordingly, there is no probability that the encapsulating member 9 is exposed around the entrance portion 8b of the through hole 8, which is on a side of the outer surface 1a of the display substrate 1. Accordingly, it is possible to obtain the electrophoretic device 10 having appearance which is not displeasing viewers and having a high commercial value.

According to this embodiment, since the encapsulating member 9 is provided so as to penetrate through the element substrate 2, it is possible to reliably seal the electro-optical material layer 3 and thus it is possible to inhibit impurities from intruding into the electro-optical material layer 3.

Second Embodiment

Hereinafter, an electrophoretic device according to a second embodiment will be described. In description relating to the second embodiment, like elements in the first embodiment and second embodiment will not be explained at all or briefly explained.

Figure 8:
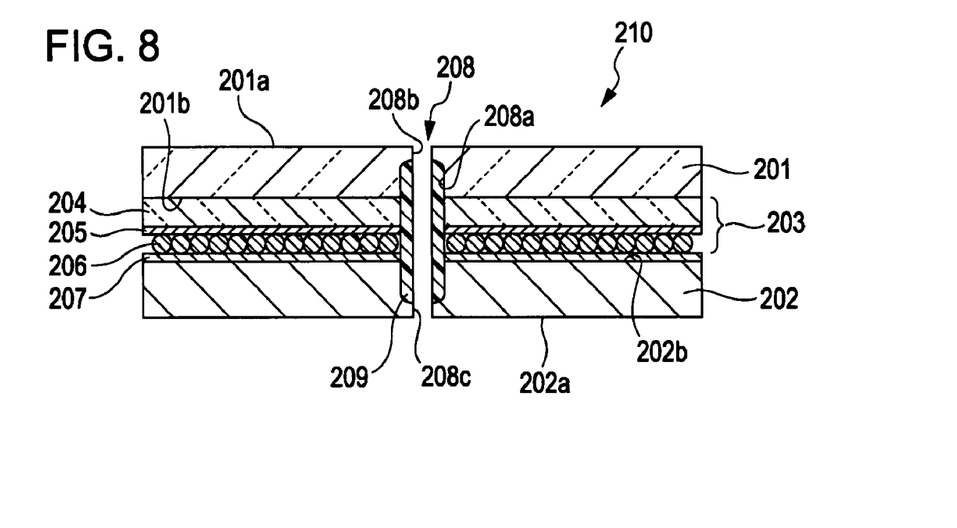
FIG. 8 is a sectional view illustrating a structure of the electrophoretic device according to a second embodiment.

As shown in FIG. 8, the electrophoretic device 210 is for use in a watch face of a wrist watch as in the first embodiment. The electrophoretic device 210 includes a pair of substrates (a display substrate 201 and an element substrate 202) and an electro-optical material layer 203 interposed between the pair of substrates as main components. The structures of the display substrate 201, the element substrate 202, and the electro-optical material layer 203 according to this embodiment are substantially the same as in the first embodiment. Accordingly, explanation thereof will be omitted.

A through hole 208 is formed at an almost center portion of the electrophoretic device 210 in a plain view so as to penetrate through the display substrate 201, the element substrate 202 and the electro-optical material layer 203. A hand spindle is installed in the through hole 208. The through hole 208 is composed of a continuous portion 208a, an entrance portion 208b and an exit portion 208c.

The continuous portion 208a links part of the display substrate 201 on an inner surface side of the display substrate 201, part of the element substrate 202 on an inner surface side of the element substrate 202 and the electro-optical material layer 203 with each other. That is, the structure of the second embodiment is different from the structure of the first embodiment in that the continuous portion 208a does not completely penetrate through the element substrate 202. The entrance portion 208b is disposed on a side of an outer surface 201a of the display substrate 201 and the exit portion 208c is disposed on a side of an outer surface 202a of the element substrate 202. Diameters of the entrance portion 208b and the exit portion 208c are almost the same as each other. However, diameter of the continuous portion 208a is larger than those of the entrance portion 208b and the exit portion 208c by about 200 μm to 4 mm. That is, diameter of the through hole 208 gradually decreases toward the entrance portion 208b and toward the exit portion 208c, respectively from the continuous portion 208a.

The continuous portion 208a of the through hole 208 is provided with an encapsulating member 209. The encapsulating member 209 is made of transparent resin, such as epoxy resin as in the first embodiment. The encapsulating member 209 seals the electro-optical material layer 203 while being disposed between the display substrate 201 and the element substrate 202. In a top plan view, the encapsulating member 209 is provided at a center portion of the electrophoretic device 10 and has an inner diameter which is almost the same as or larger than the diameter of the entrance portion 208b of the through hole 208.

The encapsulating member 209 is not present on the outer surface 201a of the display substrate 201 and is disposed closer to the electro-optical material layer 3 than the outer surface 201a of the display substrate 201 as in the first embodiment. Since the continuous portion 208 does not penetrate through the element substrate 202, the encapsulating member 209 is not present on the outer surface 202a of the element substrate 202. This makes different the second embodiment from the first embodiment.

The continuous portion 208a of the through hole 208 and the encapsulating member 209 is not disposed on part of the display substrate 201 on the outer surface side thereof. The part has a thickness not smaller than 50 µm, for example a thickness of 200 µm from the outer surface 201a of the display substrate as in the first embodiment. The encapsulating member 209 is formed outside the entrance portion 208a of the through hole 208 which is on the outer surface side of the display substrate 201 in a plan view. A thickness of the encapsulating member is preferably in a range from 100 µm to 2 mm.

Figure 9:
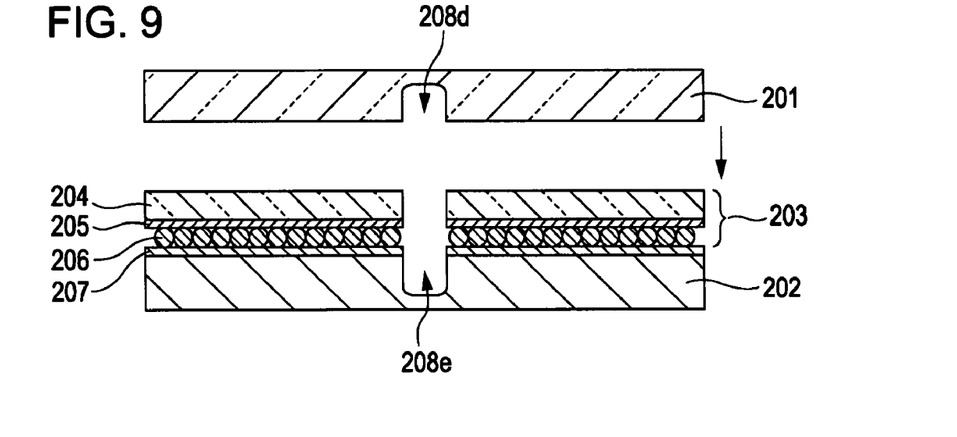
FIGS. 9 to 12 are sectional views illustrating processes of manufacturing the electrophoretic device according to the second embodiment.

Hereinafter, a method of manufacturing the electrophoretic device 210 having the above structure will be described. As shown in FIG. 9, first a hole 208d having a diameter 600 µm larger than the diameter of the through hole 208 is formed at a center portion of the display substrate 201, in a plan view, by drilling the display substrate 201. At this time, the hole 208d does not completely penetrate through the display substrate 201 but terminates at a midway of the display substrate 201, in which a distance from the outer surface 201a of the display substrate 201 is about 200 µm at the terminating position.

Separately, a common electrode 205 is formed on a film 204 and microcapsules 206 are coated on the film 204. The film 204 provided with the common electrode 205 and the microcapsules 206 are attached to the element substrate 202 using an adhesive sheet. After the film 204 is attached to the element substrate 202, a hole 208e is formed at a center portion of the element substrate 202 in a plan view by drilling the element substrate 202 from the film 204 using a drill having a diameter the same as that of the drill used when forming the hole 208d. At this time, part of the element substrate 202 which is on an outer surface side of the element substrate and which has a thickness of 200 µm from the outer surface 202a thereof remains undrilled.

In this state, the display substrate 201 and the element substrate 202 are arranged in a manner such that the hole 208d and the hole 208e of the display substrate 201 and the element substrate 202, respectively face each other. When the display substrate 201 and the element substrate 202 are aligned in a manner such that the hole 208d and the hole 208e overlap each other in a plan view of the display substrate 201. After finishing the alignment, the display substrate 201 is bonded to the film 204 of the element substrate 202 using an adhesive.

Figure 10:
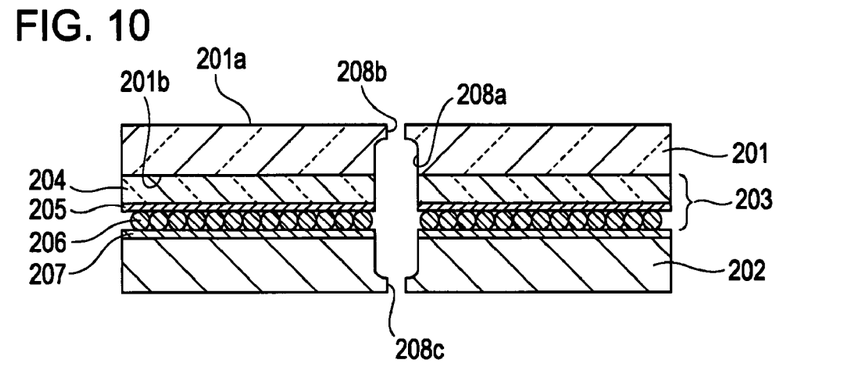

After the display substrate 201 is bonded to the film 204, as shown in FIG. 10, an entrance portion 208b and an exit portion 208c are formed by drilling the remaining parts of the display substrate 201 and the element substrate 202 at a position in which the holes 208d and 208e are formed using a drill having a diameter the same as the diameter of the through hole 208.

Figure 11:
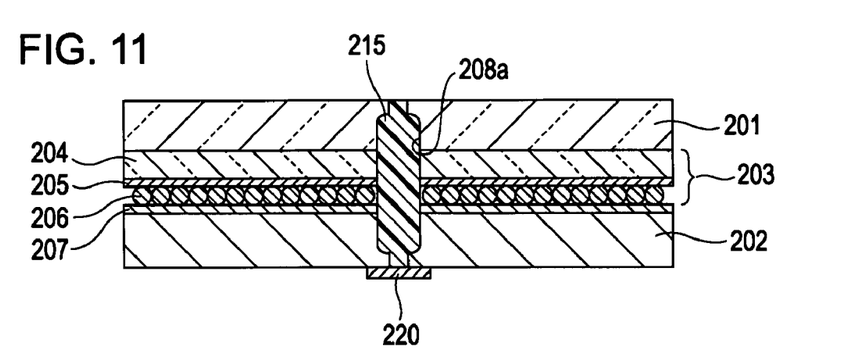

After formation of the entrance portion 208b and the exit portion 208c, as shown in FIG. 11, a resin tape 220 made of heat-resistive material, such as polyimide is attached to the outer surface 202a of the element substrate 202 so as to block the exit portion 208c, and then epoxy resin 215 having a viscosity of 2000 cp is injected into the through hole 208 through the entrance portion 208b at room temperature using a dispenser.

Figure 12:
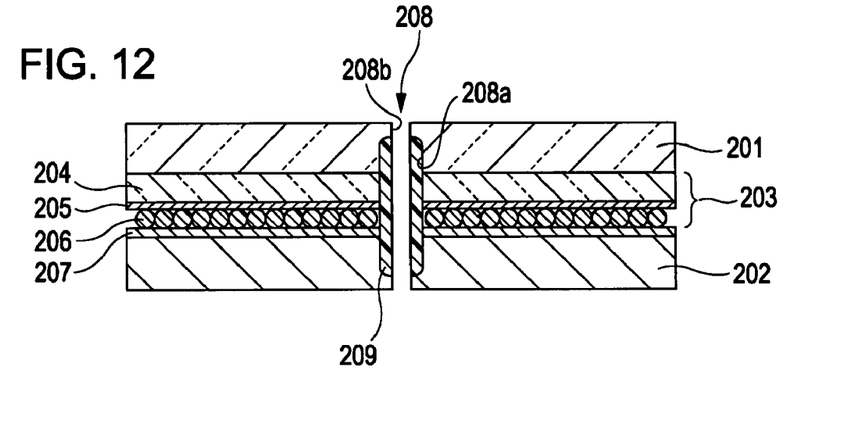

After injection of epoxy resin 215, the epoxy resin 215 is heated to and at a temperature in a range from 100 to 120° C. for an hour without causing damage to the microcapsules 206, so that the epoxy resin 215 is cured. After curing the epoxy resin 215, as shown in FIG. 12, the resin tape 220 is removed and then a hole is formed so as to completely penetrate through the epoxy resin 215 using a drill having a diameter the same as the diameter of the drill used when forming the entrance portion 208b and the exit portion 208c, thereby finishing formation of the through hole 208 and encapsulating member 209. Thus, the electrophoretic device 10 is completed.

According to this embodiment, an event that the encapsulating member 209 is present on the outer surfaces of the display substrate 201 and the element substrate 202 does not occur, and the whole encapsulating member 209 is completely received inside the electrophoretic device 210. In this manner, the encapsulating member 209 can have a stable form.

Third Embodiment

Hereinafter, an electrophoretic device according to a third embodiment will be described. In description relating to this embodiment, like elements in the first embodiment and the third embodiment will not be explained at all or briefly explained.

Figure 13:
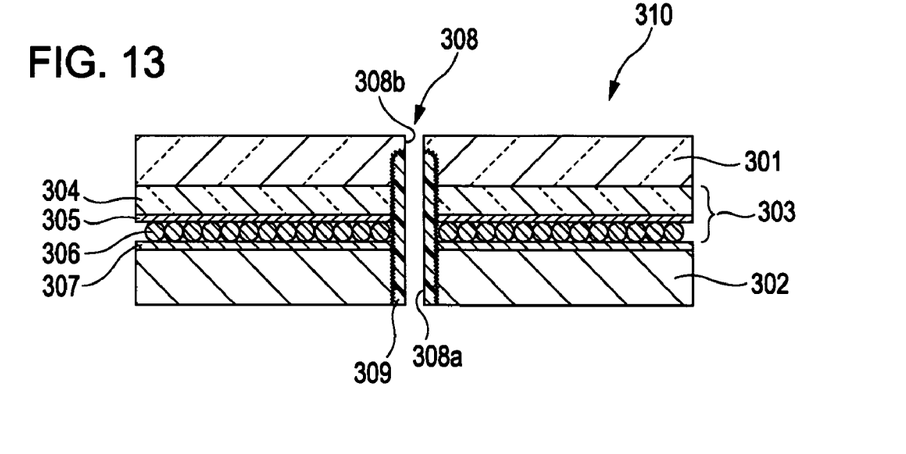
FIG. 13 is a sectional view illustrating a structure of an electrophoretic device according to a third embodiment.

As shown in FIG. 13, the electrophoretic device 310 is used as a watch face of a wrist watch as in the first embodiment. The electrophoretic device 310 mainly includes a pair of opposing substrates (a display substrate 301 and an element substrate 302) arranged to face each other, and an electro-optical material layer 303 interposed between the display substrate 301 and the element substrate 302. Since the structures of the display substrate 301, the element substrate 302, and the electro-optical material layer 303 are the same as those in the first embodiment, detailed description thereof will be omitted.

At a center portion of the electrophoretic device 310 in a plan view thereof, a through hole 308 penetrating through the display substrate 301, the element substrate 302 and the electro-optical material layer 303 is formed. A hand spindle of the wrist watch is installed in the through hole 308. The through hole 308 is composed of a continuous portion 308a and an entrance portion 308b.

The continuous portion 308a is formed to link part of the display substrate 301 on an inner surface side thereof, the electro-optical material layer 203 and part of the element substrate 202 on an inner surface side thereof with each other as in the first embodiment. This structure is the same as in the first embodiment. However, the third embodiment is different from the first embodiment in that a surface in the continuous portion 308a of the through hole 308 is rough. In detail, the entire surface of the continuous portion 308a is provided with depressions and protrusions. The mean roughness (the mean depth of depressions and the mean height of protrusions) is about 10 to 20 µm. The encapsulating member 309 is formed to cover the entire surface in the continuous portion 308a.

The depressions and protrusions of the rough surface of the continuous portion 308a can be formed by using a drill with thread dimension larger than that of the drill used in the first and second embodiments. The depressions and protrusions on the rough surface also can be formed in an alternative manner, for example, an etching method.

According to this embodiment, since the surface in the through hole 308 at a position in which the encapsulating member 309 is provided is rough, it is possible to increase a contact area between the inner surface of the through hole 308 and the encapsulating member 309, and thus it is possible to suppress impurities from intruding into the electro-optical material layer 303.

Fourth Embodiment

Figure 14:
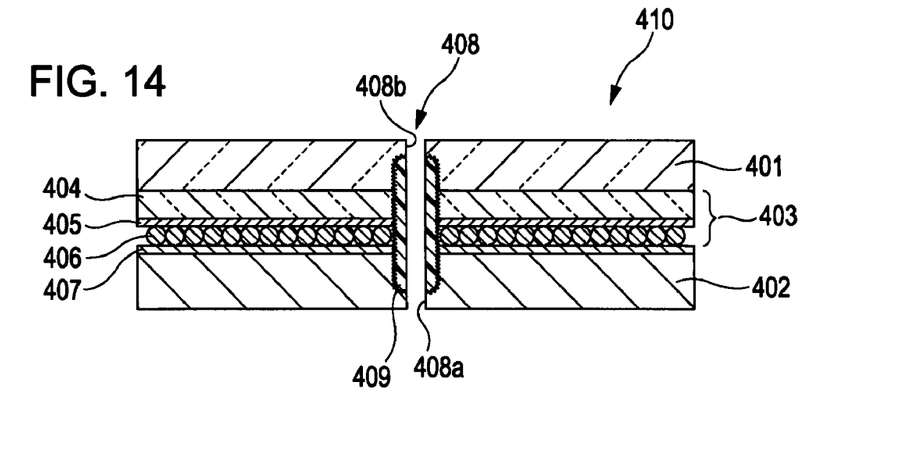
FIG. 14 is a sectional view illustrating a structure of an electrophoretic device according to a fourth embodiment.

Hereinafter, an electrophoretic device according to a fourth embodiment will be described. As shown in FIG. 14, the electrophoretic device 410 is used for a watch face of a wrist watch like the electrophoretic device according the first embodiment. The electrophoretic device 410 mainly includes a pair of substrates (a display substrate 401 and an element substrate 402) arranged to face other, and an electro-optical material layer 403 interposed between the display substrate 401 and the element substrate 402. The structures of the display substrate 401, the element substrate 402, and the electro-optical material layer 403 are almost the same as the structures as in the electrophorectic device according to the second embodiment. Accordingly, explanation thereof will be omitted.

A through hole 408 is formed at a center portion of the electrophorectic device 410 in a plan view thereof so as to penetrate through the display substrate 401, the element substrate 402 and the electro-optical material layer 403. The through hole 408 is an element for receiving a hand spindle therein. The through hole 408 is composed of a continuous portion 408, an entrance portion 408b and an exit portion 408c.

The continuous portion 408a links part of the display substrate 401 on an inner surface side thereof, the electro-optical material layer 403 and part of the element display substrate 402 on an inner surface side thereof with each other as in the second embodiment. The fourth embodiment is different from the second embodiment in that the surface in the continuous portion 408a is rough. Other structures are the same as those of the second embodiment.

In detail, the entire surface of the continuous portion 408a is provided with depressions and protrusions. The mean roughness (mean depth of the depressions and mean height of the protrusions) is about 10 to 20 μm. An encapsulating member 409 covers the entire rough surface of the continuous portion 408a.

The depressions and protrusions on the surface of the continuous portion 408a are formed by drilling the display substrate 401, the electro-optical material layer 403 and the element substrate 402 using a drill having thread dimension larger than that of the drill used in the above embodiments. The depressions and protrusions can be formed in an alternative manner, for example, an etching method.

According to this embodiment, a portion of the surface of the penetration hole 409, in which the encapsulating material 409 is provided, has a rough surface as in the third embodiment. Accordingly, it is possible to increase a contact area between the inner surface of the through hole 408 and the encapsulating member 409. Thus, it is possible to suppress impurities from intruding into the electro-optical material layer 403.

Fifth Embodiment

Figure 15:
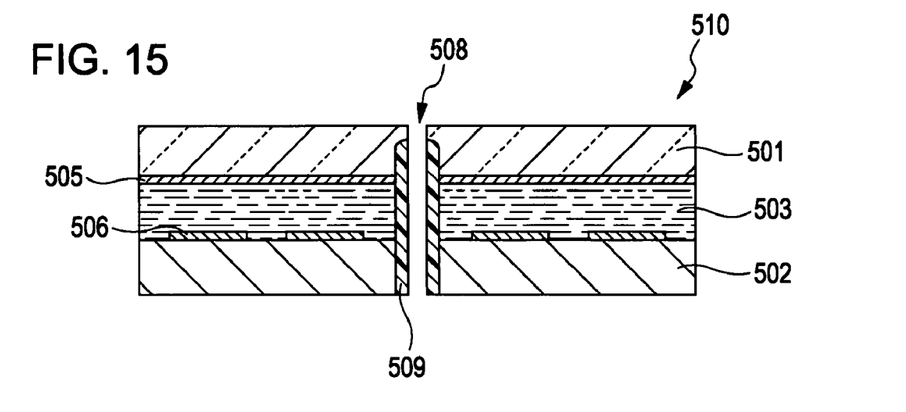
FIG. 15 is a sectional view illustrating a structure of a liquid crystal device according to a fifth embodiment.

Hereinafter, a fifth embodiment will be described. The fifth embodiment relates to a liquid crystal device for use in a watch face of a wrist watch. As shown in FIG. 15, a liquid crystal device 510 mainly includes a pair of substrates (an opposing substrate 501 and a TFT array substrate 502) arranged to face each other and an electro-optical material layer 503 interposed between the opposing substrate 501 and the TFT array substrate 502. In this embodiment, the electro-optical material layer 3 is a liquid crystal layer.

The liquid crystal device 510 has a through hole 508 at an almost center portion thereof in a plan view, the through hole 508 penetrating through the opposing substrate 501, the TFT array substrate 502, and the electro-optical material layer 503. A hand spindle is installed in the through hole 508. The structures of the through hole 508 and an encapsulating member 509 are the same as in the first embodiment.

Figure 16:
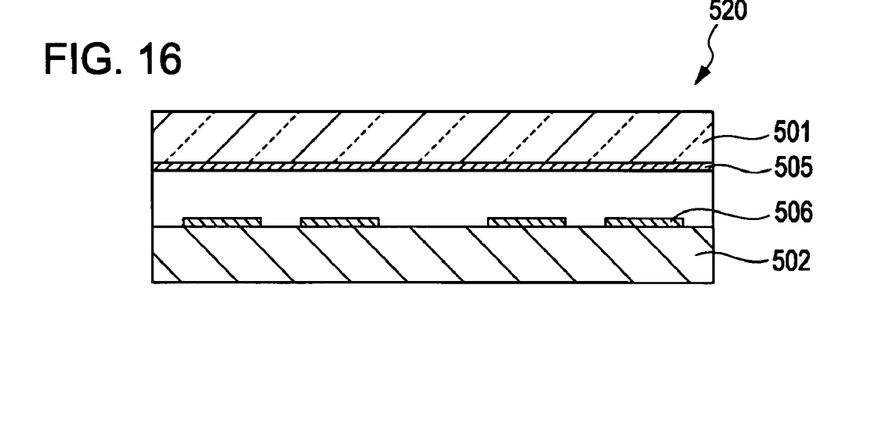
FIGS. 16 to 18 are sectional views illustrating processes of manufacturing the liquid crystal device according to the fifth embodiment.

A method of manufacturing the liquid crystal device 510 having the above structure will be described below. As shown in FIG. 16, an opposing substrate 501 on which a common electrode 505 is formed and an TFT array substrate 502 on which pixel electrodes 506, TFT elements and wirings are formed are bonded to each other with a sealing material therebetween, thereby forming a liquid crystal panel 520. The sealing material has a liquid crystal injection hole therein.

Figure 17:
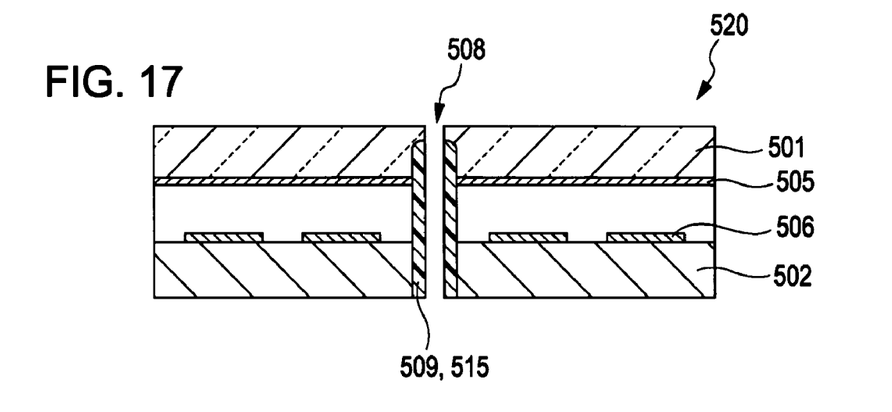

After completion of the liquid crystal panel 520, a hole is formed so as to penetrate through the TFT array substrate 502 and into part of the opposing substrate 501 at an almost center portion in a plan view of the panel 520 using a drill. Epoxy resin 515 is injected into the hole and cured. After that, a through hole 508 is formed to penetrate through the cured epoxy resin 515 and through the remaining part of the opposing substrate 501, while producing the encapsulating member 509. FIG. 17 shows a structure of the liquid crystal device in which formation of the through hole 508 and the encapsulating member 509 is finished.

Figure 18:
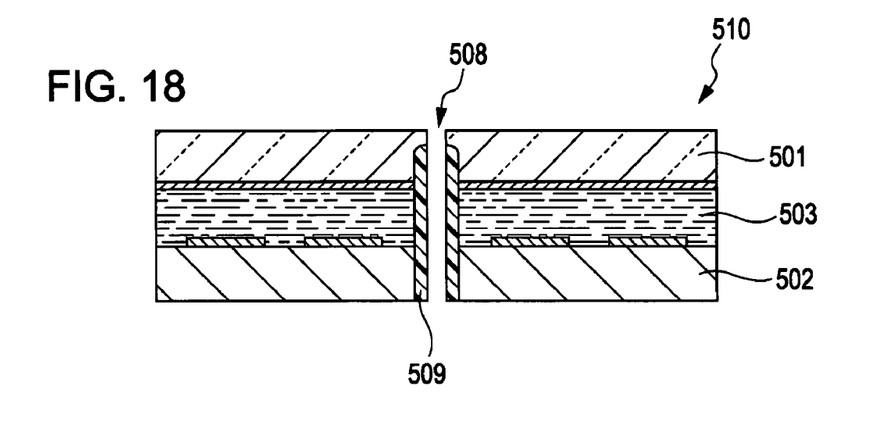

After forming of the through hole 508, liquid crystal is injected into the structure shown in FIG. 17 through the liquid crystal injection hole. As a result, an electro-optical material layer 503 in which liquid crystal is surrounded by the opposing substrate 501, the TFT array substrate 502 and the sealing material is manufactured, as shown in FIG. 18. After formation of the electro-optical material layer 503, the liquid crystal injection hole is blocked. Thus, the liquid crystal device 510 is completed.

According to this embodiment, the electro-optical material layer 503 is a liquid crystal layer, and liquid crystal is injected after formation of the through hole 508. Accordingly, it is possible to reliably seal the electro-optical material layer 503 even in the case in which the electro-optical material layer is a liquid type layer such as a liquid crystal layer.

The scope of the invention is not limited to the above embodiments but it is understood that changes and variations may be made without departing from the spirit or scope of the invention. For example, even though a watch face 101 of a wrist watch 100 is illustrated as a flat face, but the invention can be applied to any structure in which the watch face 101 is a curved face, a pointed face or a multi-plane face composed of different planes inclining to each other at a predetermined angle.

Further, according to the embodiments, the microcapsule 6 contains a dispersion medium 11, white particles 12 and colored particles 13 therein. However, the structure of the microcapsule will not be limited thereto. For example, the microcapsule may contain only a dispersion medium and white particles. In the case in which the microcapsule contains only a dispersion medium and white particles, the white particles 12 migrate to the pixel electrodes by attraction, so that the display portion may display a color of the dispersion medium.

Still further, the manufacturing method of the electrophoretic device according to the invention may be applied to a method of manufacturing a full-color electrophoretic display device in which a display portion has only white sub-pixels or black sub-pixels and a color filter is disposed on the display portion to realize a full-color display.

Yet further, the silicon views may displace the microcapsules 6. The term "silicon views" refers to a particle in which a hemispherical face on one side thereof is negatively charged and colored white and a hemispherical face on the other side thereof is positively charged and colored any color other than white, in which the particle is sealed in a microcapsule. The silicon views can display a color in a display region based on direction change of the particle according to application of electric field.

In the embodiment, it is exemplified that the microcapsule 6 has a spherical shape but the shape of the microcapsule 6 may not be necessarily spherical but be, for example, rectangular.

What is claimed is:

1. An electro-optical device, comprising:
   a pair of substrates arranged so as to face each other;
   an electro-optical material layer interposed between the pair of substrates;
   a through hole penetrating through the pair of substrates and the electro-optical material; and
   an encapsulating member disposed in the through hole for sealing the electro-optical material layer while being disposed between the pair of substrates;
   wherein the encapsulating member is disposed closer to the electro-optical material layer than an outer surface of a display substrate of the pair of substrates and outside an entrance portion of the through hole, in a plan view, the entrance portion being on an outer surface side of the display substrate.

2. The electro-optical device according to claim 1, wherein a surface of the through hole is rough.

3. The electro-optical device according to claim 1, wherein the encapsulating member penetrates through one substrate other than the display substrate of the pair of substrates.

4. The electro-optical device according to claim 1, wherein the encapsulating member is disposed closer to the electro-optical material layer than an outer surface of one substrate other than the display substrate of the pair of substrates.

5. The electro-optical device according to claim 1, wherein the electro-optical material layer is an electrophoretic layer having a plurality of capsules, each containing colored particles which can cause an electrophoretic reaction and a dispersion medium for dispersing the colored particles therein.

6. A method of manufacturing an electro-optical device having a pair of substrates arranged so as to face each other and an electro-optical material layer interposed between the pair of substrates, comprising:
   arranging the pair of substrates so as to face each other,
   forming a continuous hole so as to link the pair of substrates and the electro-optical material layer with each other but not link part of a display substrate, which is on a display surface side of the display substrate, of the pair of substrates;
   sealing the electro-optical material layer in the continuous hole; and
   forming a through hole having a diameter smaller than that of the continuous hole at a region where the continuous hole is provided so as to penetrate through the pair of substrates and the electro-optical material layer.

7. The method of manufacturing an electro-optical device according to claim 6, wherein the continuous hole is formed by forming a first concave in the display substrate in a manner such that the first concave terminates at a midway portion of the display substrate so as to leave part of the display substrate on the display surface side thereof unpenetrated, forming a second concave in one substrate other then the display substrate in a manner such that the second concave terminates at a midway portion of the substrate so as to leave part of the substrate on an outer surface side of the substrate unpenetrated, the outer surface not being a surface on which the electro-optical layer is formed, and arranging the pair of substrates in a manner such that the first concave and the second concave face each other.

8. The method of manufacturing an electro-optical device according to claim 6, wherein the continuous hole is formed so as to penetrate through the substrate other than the display substrate of the pair of substrates.

9. The method of manufacturing an electro-optical device according to claim 6, wherein the electro-optical material layer is a liquid crystal layer, and is provided between the pair of substrates after formation of the through hole.

10. An electronic apparatus on which the electro-optical device according to claim 1 or the electro-optical device manufactured by the manufacturing method according to claim 6 is mounted.

* * * * *